US008346503B2

(12) United States Patent
Eun et al.

(10) Patent No.: US 8,346,503 B2
(45) Date of Patent: Jan. 1, 2013

(54) SYSTEM AND METHOD FOR EQUALIZING MULTIPLE MOVING WEB VELOCITY MEASUREMENTS IN A DOUBLE REFLEX PRINTING REGISTRATION SYSTEM

(75) Inventors: Yongsoon Eun, Webster, NY (US); Jeffrey J Folkins, Rochester, NY (US); Jess R Gentner, Rochester, NY (US)

(73) Assignee: Xerox Corporation, Norwalk, CT (US)

( * ) Notice: Subject to any disclaimer, the term of this patent is extended or adjusted under 35 U.S.C. 154(b) by 699 days.

(21) Appl. No.: 12/558,226

(22) Filed: Sep. 11, 2009

(65) Prior Publication Data

US 2011/0061552 A1 Mar. 17, 2011

(51) Int. Cl.
*G06P 9/00* (2006.01)
*G06P 11/00* (2006.01)
*G01P 3/32* (2006.01)

(52) U.S. Cl. ............ 702/142; 156/64; 356/28; 399/325

(58) Field of Classification Search ........................ None
See application file for complete search history.

(56) References Cited

U.S. PATENT DOCUMENTS 3,364,404 A 1/1968 Carlson
4,875,769 A * 10/1989 Linebarger ...................... 356/28
4,990,767 A 2/1991 Ernst et al.
5,312,033 A 5/1994 Walton et al.
5,455,668 A 10/1995 De Bock et al.
5,499,093 A 3/1996 Aerens et al.
5,556,492 A * 9/1996 Vonderhorst et al. ........... 156/64
5,600,352 A 2/1997 Knierim et al.
5,828,937 A 10/1998 Aerens et al.
6,076,922 A 6/2000 Knierim et al.
6,215,119 B1 4/2001 Markham et al.
6,330,424 B1 12/2001 Chapman et al.
6,407,678 B1 6/2002 Elgee et al.
7,245,862 B2 7/2007 Ebara
7,467,838 B2 12/2008 Folkins et al.
7,583,920 B2 9/2009 Willemsens et al.
7,587,157 B2 9/2009 Matsuda et al.
2003/0210932 A1 11/2003 Koide et al.
2005/0175379 A1* 8/2005 Berg et al. ..................... 399/325
2008/0088661 A1 4/2008 Folkins et al.
2008/0124158 A1 5/2008 Folkins
2010/0123752 A1* 5/2010 Eun et al. ........................ 347/19

FOREIGN PATENT DOCUMENTS

JP 2000069778 3/2000

OTHER PUBLICATIONS

European Search Report corresponding to European Patent Application 10175902.5, European Patent Office, Munich Germany, Dec. 21, 2010 (6 pages).

* cited by examiner

*Primary Examiner* — John H Le
(74) *Attorney, Agent, or Firm* — Maginot, Moore & Beck, LLP

(57) ABSTRACT

A method enables linear web velocities generated with reference to angular velocity signals generated by encoders at different rollers in a double reflex printing registration system to be equalized. The method includes identifying a low frequency component of a first linear velocity of a moving web, identifying a high frequency component of a second linear velocity of the moving web, and computing a linear velocity for the moving web at a roller in a print zone with reference to the identified high frequency component of the second linear velocity and the identified low frequency component of the first linear velocity.

17 Claims, 3 Drawing Sheets

SYSTEM AND METHOD FOR EQUALIZING MULTIPLE MOVING WEB VELOCITY MEASUREMENTS IN A DOUBLE REFLEX PRINTING REGISTRATION SYSTEM

TECHNICAL FIELD

This disclosure relates generally to moving web printing systems, and more particularly, to moving web printing systems that use a double reflex system to register images from different printheads.

BACKGROUND

A known system for ejecting ink to form images on a moving web of media material is shown in FIG. 4. The system 10 includes a web unwinding unit 14, a media preparation station 18, a pre-heater roller 22, a plurality of marking stations 26, a turn roller 30, a leveling roller 34, and a spreader 38. In brief, the web unwinding unit 14 includes an actuator, such as an electrical motor, that rotates a web of media material in a direction that removes media material from the web. The media material is fed through the media preparation station 18 along a path formed by the pre-heater roller 22, turn roller 30, and leveling roller 34 and then through the spreader 38 to a rewinder 40. The media preparation station 18 removes debris and loose particulate matter from the web surface to be printed and the pre-heater roller 22 is heated to a temperature that transfers sufficient heat to the media material for optimal ink reception on the web surface as it passes the marking stations 26. Each of the marking stations 26A, 26B, 26C, and 26D in FIG. 4 includes two staggered full width print head arrays, each of which has three or more print heads that eject ink onto the web surface. The different marking stations eject different colored inks onto the web to form a composite colored image. In one system, the marking stations eject cyan, magenta, yellow, and black ink for forming composite colored images. The surface of the web receiving ink does not encounter a roller until it contacts the leveling roller 34. Leveling roller 34 modifies the temperature of the web and reduces any temperature differences between inked and non-inked portions of the web. After the temperature leveling the ink is heated by heater 44 before the printed web enters the spreader 38. The spreader 38 applies pressure to the ejected ink on the surface of the web to smooth the roughly semicircular ink drops on the surface of the web and to encourage ink fill with the different colors and present a more uniform image to a viewer. The web material is then wound around the rewinding unit 40 for movement to another system for further processing of the printed web.

This system 10 also includes two load cells, one of which is mounted at a position near pre-heater roller 22 and the other is mounted at a position near the turn roller 30. These load cells generated signals corresponding to the tension on the web proximate the position of the load cell. Each of the rollers 22, 30, and 34 has an encoder mounted near the surface of the roller. These encoders may be mechanical or electronic devices that measure the angular velocity of a roller monitored by the encoder, which generates a signal corresponding to the angular velocity of the roller. In a known manner, the signal corresponding to the angular velocity measured by an encoder is provided to the controller 60, which converts the angular velocity to a linear web velocity. The linear web velocity may also be adjusted by the controller 60 with reference to the tension measurement signals generated by the load cells. The controller 60 is configured with I/O circuitry, memory, programmed instructions, and other electronic components to implement a double reflex printing system that generates the firing signals for the printheads in the marking stations 26. A double reflex printing process is described in U.S. patent application Ser. No. 11/605,735, which issued on Feb. 23, 2010 as U.S. Pat. No. 7,665,817, is entitled "Double Reflex Printing," and is commonly owned by the assignee of the present document. The term "controller" or "processor" as used in this document refers to a combination of electronic circuitry and software that generates electrical signals that control a portion or all of a process or system.

The system 10 may also include an image-on-web array (IOWA) sensor 68 that generates an image signal of a portion of the web as it passes the IOWA sensor. The IOWA sensor 68 may be implemented with a plurality of optical detectors that are arranged in a single or multiple row array that extends across at least a portion of the web to be printed. The detectors generate signals having an intensity corresponding to a light reflected off the web. The light is generated by a light source that is incorporated in the IOWA sensor and directed toward the web surface to illuminate the surface as it passes the optical detectors of the IOWA sensor. The intensity of the reflected light is dependent upon the amount of light absorbed by the ink on the surface, the light scattered by the web structure, and the light reflected by the ink and web surface. The image signal generated by the IOWA sensor is processed by an integrated registration color controller (IRCC) to detect the presence and position of ink drops ejected onto the surface of the web at the IOWA sensor.

As noted above, the controller 60 uses the tension measurements from the two load cells along with the angular velocity measurements from encoders to compute linear web velocities at the rollers 22, 30, and 34. These linear velocities enable the processor to determine when a web portion printed by one marking station, station 26A, for example, is opposite another marking station, stations 26B, for example, so the second marking station can be operated by the controller 60 with firing signals to eject ink of a different color onto the web in proper registration with the ink already placed on the web by a previous marking station. When the subsequent marking station is operated too soon or too late, the ejected ink lands on the web at positions that may produce visual noise in the image. This effect is known as misregistration. Accurate measurements, therefore, are important in registration of different colored images on the web to produce images with little or no visual noise.

SUMMARY

A method enables linear web velocities produced with reference to angular velocity signals generated by encoders at different rollers in a double reflex printing registration system to be equalized. The method includes identifying a low frequency component of a first linear velocity of a moving web, identifying a high frequency component of a second linear velocity of the moving web, and computing a linear velocity for the moving web at a roller in a print zone with reference to the identified high frequency component of the second linear velocity and the identified low frequency component of the first linear velocity.

A system for implementing the equalization method has been developed. The system includes a first converter configured to generate a first linear velocity for a moving web at a first roller that drives a web of printable media from a first angular velocity measurement signal generated by a first encoder mounted proximate the first roller, a second converter configured to generate a second linear velocity for a moving web at a second roller that drives a web of printable media from a second angular velocity measurement signal generated by a second encoder mounted proximate the second roller, a low pass filter coupled to the first converter to identify a low frequency component of the first linear velocity, a high pass filter coupled to the second converter to identify a high frequency component of the second linear velocity, and a controller configured to compute a linear velocity of the moving web at the second roller with reference to the identified high frequency component of the second linear velocity and the low frequency component of the first linear velocity.

BRIEF DESCRIPTION OF THE DRAWINGS

The foregoing aspects and other features of a system and method that equalizes linear velocity measurements produced from angular velocity measurements obtained with encoders at different rollers driving a web of printable media are explained in the following description, taken in connection with the accompanying drawings.

DETAILED DESCRIPTION

Figure 1:
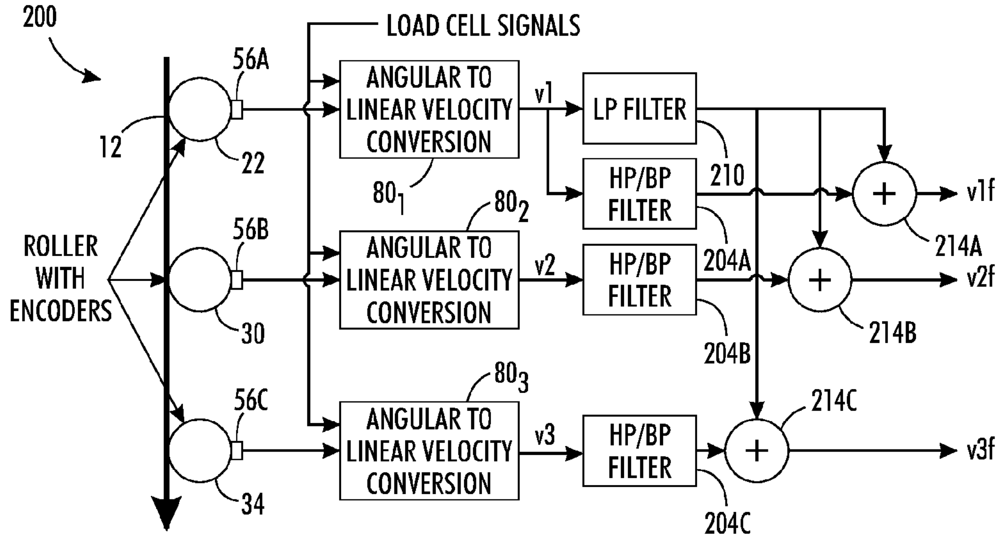
FIG. 1 is a block diagram of system components that are used to equalize linear velocities obtained with reference to angular velocities of different rollers driving a web of printable media in a double reflex printing registration system.

For a general understanding of the environment for the system and method disclosed herein as well as the details for the system and method, reference is made to the drawings. In the drawings, like reference numerals have been used throughout to designate like elements. As used herein, the word "printer" encompasses any apparatus that performs a print outputting function for any purpose, such as a digital copier, bookmaking machine, facsimile machine, a multi-function machine, or the like. Also, the description presented below is directed to a system for operating a printer that forms images on a moving web driven by rollers. The reader should also appreciate that the principles set forth in this description may be applicable to imaging systems that form images on sheets.

In one embodiment of a printing system that uses a double reflex technique to control the firing of the printheads in the marking stations, the marking stations are solid ink marking stations. Solid ink marking stations use ink that is delivered in solid form to the printer, transported to a melting device where the ink is heated to a melting temperature and converted to liquid ink. The liquid ink is supplied to the print heads in the marking stations and ejected from the print heads onto the moving web in response to firing signals generated by the controller 60. In such a continuous feed direct marking system, the print zone is the portion of the web extending from the first marking station to the last marking station. In some systems, this print zone may be several meters long. If the angular velocity of each encoder mounted proximate to a roller is converted to a linear speed for the web, the variations between the linear web velocities at the different rollers over time can accumulate and lead to misregistration of the images.

At steady state for such a printing system, the average web velocity times the web material mass per length must be equal at all rollers or other non-slip web interface surfaces. Otherwise, the web would either break or go slack. To account for the differences in instantaneous velocities at rollers in or near a print zone, a double reflex processor interpolates between linear web velocities at a pair of rollers, one roller on each side of a marking station with reference to the direction of the moving web, to identify a linear velocity for the web at a position proximate the marking station. This interpolation uses the linear web velocity derived from the angular velocity of a roller placed at a position before the web reaches the marking station and the linear web velocity derived from the angular velocity of a roller placed at a position after the web passes by the marking station along with the relative distances between the marking station and the two rollers. The interpolated value correlates to a linear web velocity at the marking station. A linear web velocity is interpolated for each marking station. The interpolated web velocity at each marking station enables the processor to generate the firing signals for the print heads in each marking station to eject ink as the appropriate portion of the web travels past each marking station. Any differences arising between the linear velocities for the web at the rollers arise from inaccuracies that may lead to linear web velocity errors at the marking stations. These errors may lead to misregistration between ink patterns ejected by different marking stations. In the double reflex control method, these errors may affect each station and roller differently because of the different distances separating them. Calibrating the encoders that generate the angular velocity signals used for the linear velocities computations is insufficient to address the variations in the linear velocities because small errors may eventually accumulate and cause misregistration. For example, a roller diameter miscalculation of only 5 μm, which is approximately a 0.002% error for one roller, would yield a continuously growing error of about 10 μm per meter of web travel.

To address this source of linear web velocity and position error, a method and system have been developed that approximates a base speed for the web at all of the rollers. The system 200 is shown in block diagram form in FIG. 1. As depicted in that figure, the web 12 is driven by rollers 22, 30, and 34 in the direction indicated by the arrow. The web and roller configuration is shown in a simplified arrangement in FIG. 1. Encoders 56A, 56B, and 56 C are mounted proximate to one of the rollers 22, 30, and 34, respectively, to generate an angular velocity measurement signal for the roller. Coupled to each encoder output signal is a converter for generating a linear velocity from the angular velocity signal. The converters $\mathbf{80}_1$, $\mathbf{80}_2$, and $\mathbf{80}_3$ are coupled to the encoders 56A, 56B, and 56C, respectively. The converters may be stand alone processors, ASICs, or hardware/software circuits that convert an angular velocity signal to a linear web velocity. In general, the converters generate a linear velocity with reference to the circumference of a roller and the number of pulses produced by an encoder per revolution of the roller. Additionally, each converter may receive signals from the load cells that correspond to tension on the web at various positions. These tension measurements and other data, such as the mass of the web per unit of length, may be used to adjust the linear velocities generated by a converter and these adjustments to the linear velocity are made prior to the filtering of the linear velocities described below.

With continued reference to FIG. 1, each converter $\mathbf{80}_1$, $\mathbf{80}_2$, and $\mathbf{80}_3$ is coupled, respectively, to a corresponding high pass filter 204A, 204B, or 204C. These high pass filters enable only the relatively rapidly changes in linear velocity to pass through. In one embodiment, this filter has a cutoff frequency of 0.1 Hz. Of course, the cutoff frequency for any filter discussed in this document may be adjusted to accommodate the system parameters, such as web length, average speed, media density, and the like. This filter, in effect, removes the average velocity component of the encoder output signal. Additionally, a low pass filter 210 is coupled to the linear velocity of the first converter output. The output of this filter is a relatively slow changing signal. In the same embodiment, the cutoff frequency for the low pass filter is also 0.1 Hz. This signal corresponds to the average linear velocity of the web at a roller. The method and system discussed in this document are implemented with an assumption that this low pass filtered signal corresponds to the average linear velocity of the web throughout the print zone and that this average linear velocity does not change at the rollers. Otherwise, the web would break or go slack.

Again with reference to FIG. 1, the system includes three adders 214A, 214B, and 214C, each of which sums the low pass filtered signal for the first roller with the high pass filtered signal for a corresponding roller. For example, the first adder 214A adds the low pass filtered signal from filter 210 and the high pass filtered signal for the first roller from filter 204A. The output signal of this adder corresponds to the unfiltered linear velocity of the first converter $\mathbf{80}_1$. The second adder 214B adds the low pass filtered signal for the first roller from filter 210 to the high pass filtered signal for the second roller from the filter 214B. The output of this adder represents the average linear velocity of the web with the high frequency variations in the linear web velocity at the second roller. The third adder 214C adds the low pass filtered signal for the first roller from filter 210 to the high pass filtered signal for the third roller from filter 214C. The output of this adder is a composite signal that represents the average linear velocity of the web with the high frequency variations in the linear web velocity at the third roller. By using these signals, the controller 60 avoids web velocity calculation errors associated with linear velocity variations occurring at each roller because the average web velocity is now equalized to the low frequency component of the linear web velocity at the first roller. This common baseline for the linear web velocities at each roller improves the accuracy of the web velocity calculation at each roller. Consequently, the interpolated web velocities computed by the controller for each marking station are also more accurate and misregistration is less frequent.

While the low frequency component is obtained from a low pass filtering of the linear web velocity at a first roller in FIG. 1, the low frequency component may be obtained in other ways. For example, the system of FIG. 1 may include a low pass filter for each converter. The linear web velocity computed by a converter from the angular velocity at a roller in a print zone may then be low pass filtered and the low frequency components averaged to obtain a low frequency component that may be used as the common baseline for the linear web velocities at each roller. In other embodiments, the low frequency component may be a predetermined value empirically determined for a particular set of printing process parameters observed over some period of time or a sequence of values empirically determined in a similar fashion.

Figure 2:
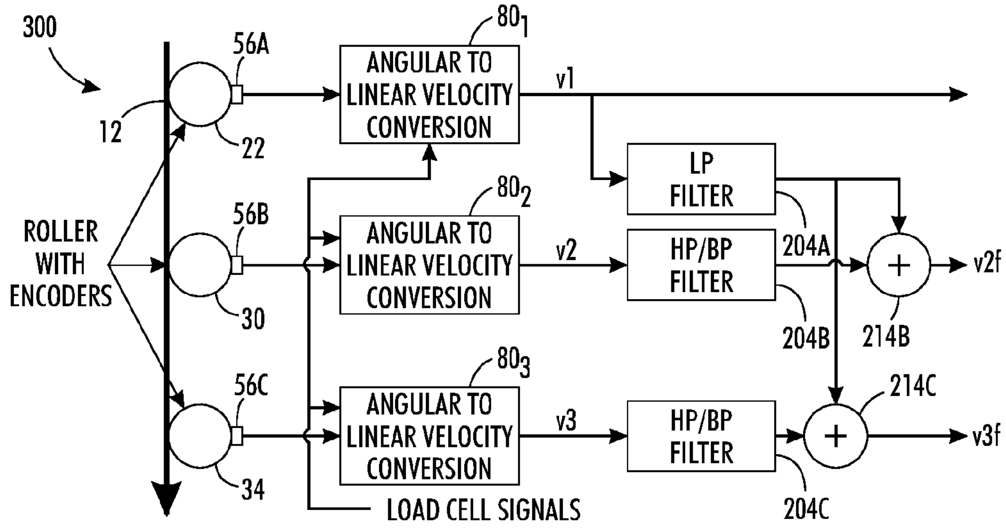
FIG. 2 is a block diagram of an alternative configuration for the system shown in FIG. 1.

An alternative embodiment of the system is shown in FIG. 2. In this system 300, the linear web velocity generated by the first converter $\mathbf{80}_1$ from the encoder output for the first roller is not fed to a high pass filter and the controller uses the unfiltered linear velocity for web velocity calculations at the first roller. The linear web velocity generated by the converter $\mathbf{80}_2$ from the output signal of the first encoder 56A is low pass filtered by filter 210 and supplied to the adders 214B and 214C. Adder 214B is also coupled to the output signal of a high pass filter 204B, which is coupled to the linear velocity generated by the converter $\mathbf{80}_2$ from the output of encoder 56B for the second roller. Also, adder 214C is coupled to the output signal of the high pass filter 204C, which is coupled to the linear velocity generated by the converter $\mathbf{80}_3$ from the output of the encoder 56C for the third roller. Thus, the high frequency components of the linear velocity measured at the second and the third rollers are added to the low frequency component of the linear velocity measured at the first roller to establish the average velocity for the rollers. The system 300 is less expensive because it requires the use of one less filter.

The reader should understand that the use of the sequential terms "first", "second", and "third" do not specify a roller with reference to their order along the path of the web as it moves through the printing system. Thus, the linear velocity for the web at any of the rollers may be used to establish an average velocity for the web at all of the rollers. The high frequency components identified by the high pass filters may then be used for further refinement of the linear velocities at the rollers.

In another embodiment, the converters may receive a compensation value that is used to generate a linear web velocity. In one embodiment, this compensation value may correspond to a relatively small constant value for a predetermined web tension intended to be maintained in the web portion immediately preceding the roller at which the linear web velocity is generated. In another embodiment, this compensation value may correspond to an actual web tension measurement obtained from a load cell positioned immediately prior to the roller at which the linear web velocity is generated. These compensation values are used by the converters to produce the linear web velocity before the linear web velocity is low pass or high pass filtered.

The controller 60 that uses the filtered signals to compute the web velocities at the rollers and marking stations includes memory storage for data and programmed instructions. The controller may be implemented with general or specialized programmable processors that execute programmed instructions. The instructions and data required to perform the programmed functions may be stored in memory associated with the processor. The programmed instructions, memories, and interface circuitry configure the controller to perform the functions for computing web velocities at various locations and generating firing signals in correlation with those computed velocities. These components may be provided on a printed circuit card or provided as a circuit in an application specific integrated circuit (ASIC). Each of the circuits may be implemented with a separate processor or multiple circuits may be implemented on the same processor. Alternatively, the circuits may be implemented with discrete components or circuits provided in VLSI circuits. Also, the circuits described herein may be implemented with a combination of processors, ASICs, discrete components, or VLSI circuits.

Figure 3:
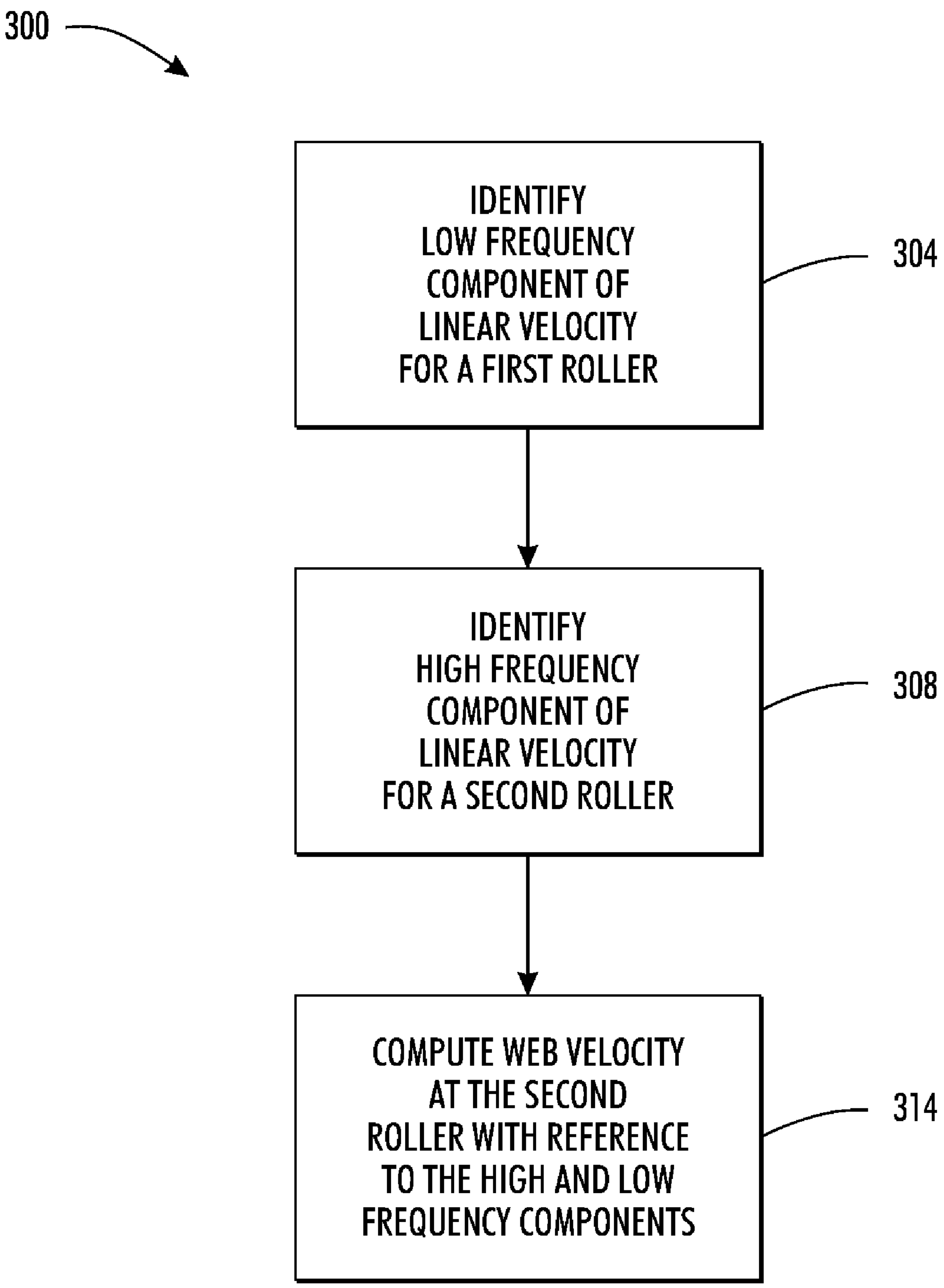
FIG. 3 is a flow diagram of a process that may be implemented by a processor operating a plurality of marking stations in accordance with a double reflex registration method.
Figure 4:
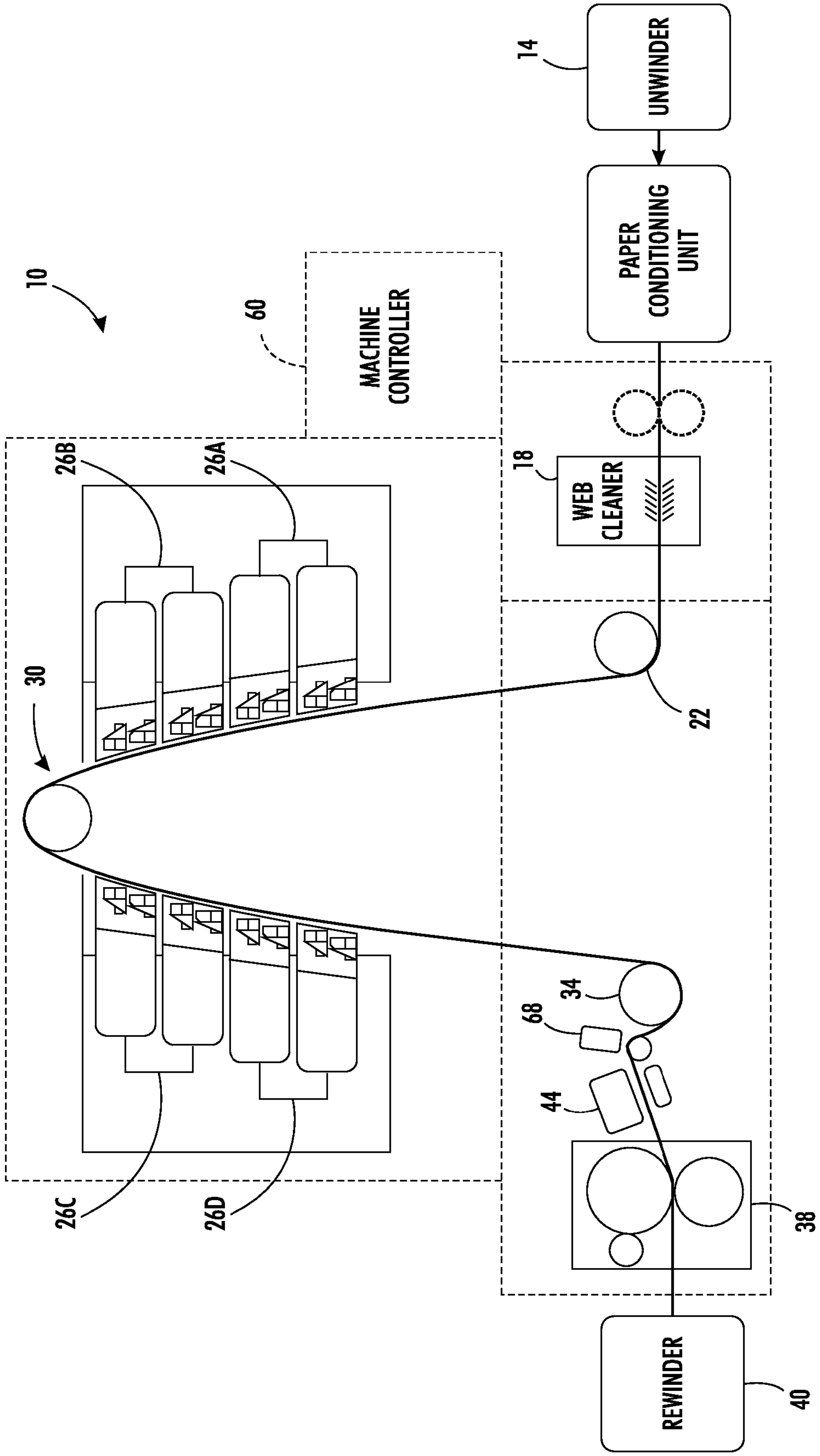
FIG. 4 PRIOR ART
FIG. 4 is a block diagram of a prior art double reflex web printing system.

A method of establishing a common average linear velocity for the rollers in a double reflex printing system and computing web velocities is shown in FIG. 3. The method 300 begins by identifying a low frequency component of a first linear velocity of the web at a first roller driving a web of printable media (block 304). A high frequency component of a second linear velocity of the web at a second roller driving the moving web is also identified (block 308). A linear velocity of the moving web at the second roller is then computed with reference to the identified high frequency component of the linear velocity at the second roller and the identified low frequency component of the linear velocity at the first roller (block 314). As noted above, the low frequency component of the linear velocity generated with reference to the angular velocity signal generated by the first encoder may be obtained with a low pass filter and the high frequency component of the linear velocity generated with reference to the angular velocity signal generated by the second encoder may be obtained with a high pass filter. The computation of the moving web velocity may be performed by adding the low frequency component of the first linear velocity with the high frequency component of the second linear velocity. The computed web velocities for the rollers on either side of a marking station may be used by a controller implementing a double reflex control system for registration control to interpolate web velocities at positions opposite the marking stations.

It will be appreciated that various of the above-disclosed and other features, and functions, or alternatives thereof, may be desirably combined into many other different systems or applications. Various presently unforeseen or unanticipated alternatives, modifications, variations, or improvements therein may be subsequently made by those skilled in the art, which are also intended to be encompassed by the following claims.

What is claimed is:

1. A method for computing a linear velocity of a moving web in a print zone comprising:

identifying with a low pass filter a low frequency component of a linear velocity of a moving web at a first roller in a print zone;

identifying with a high pass filter a high frequency component of the linear velocity of the moving web at a second roller in the print zone; and computing a linear velocity for the moving web at the second roller in the print zone by using the identified high frequency component of the linear velocity at the second roller to modify a linear velocity of the web corresponding to the identified low frequency component of the linear velocity of the moving web at the first roller.

2. The method of claim 1, the identification of the low frequency component of the linear velocity at the first roller further comprising:

identifying with a second low pass filter a low frequency component of the linear velocity of the moving web at the second roller in the print zone;

averaging the low frequency component of the linear velocity of the moving web at the first roller and the second low frequency component of the linear velocity of the moving web at the second roller to identify an average low frequency component of the linear velocity for the moving web; and computing the linear velocity for the moving web at the second roller by using the identified high frequency component of the linear velocity of the moving web at the second roller to modify the linear velocity of the moving web corresponding to the average low frequency component of the linear velocity for the moving web.

3. The method of claim 1, the computation of the linear velocity for the moving web at the second roller in the print zone further comprising:

adding the identified low frequency component of the linear velocity at the first roller to the identified high frequency component of the linear velocity at the second roller.

4. The method of claim 1 further comprising:

identifying with a high pass filter a high frequency component of the linear velocity of the moving web at the first roller; and computing the linear velocity for the moving web at the first roller in the print zone by adding the identified low frequency component of the linear velocity of the moving web and the identified high frequency component of the linear velocity of the moving web to identify the linear velocity of the moving web at the first roller.

5. The method of claim 1 further comprising:

interpolating a linear velocity for the moving web at a marking station between the first roller and the second roller by modifying the linear velocity of the moving web corresponding to the low frequency component of the linear velocity for the moving web at the first roller with the high frequency component of the linear velocity for the moving web at the second roller, a first distance between the marking station and the first roller, and a second distance between the marking station and the second roller.

6. The method of claim 1, the linear velocity computation further comprising:

adjusting the computed linear velocity for the moving web with reference to a web density variation.

7. The method of claim 6, the web velocity adjustment further comprising:

adjusting the web velocity with reference to a web tension.

8. The method of claim 1 further comprising:

converting an angular velocity of a first roller in the print zone to the linear velocity of a moving web at the first roller; and converting an angular velocity of a second roller in the print zone to the linear velocity of the moving web at the second roller.

9. A system for computing a linear velocity of a moving web in a print zone comprising:

a first converter configured to generate a first linear velocity for a moving web at a first roller in a print zone that drives a web of printable media from a first angular velocity measurement signal generated by a first encoder mounted proximate the first roller;

a second converter configured to generate a second linear velocity for the moving web at a second roller in the print zone that drives the web of printable media from a second angular velocity measurement signal generated by a second encoder mounted proximate the second roller;

a low pass filter coupled to the first converter to identify a low frequency component of the first linear velocity;

a high pass filter coupled to the second converter to identify a high frequency component of the second linear velocity; and a controller configured to compute a linear velocity of the moving web at the second roller by adjusting the linear velocity of the web corresponding to the low frequency component at the first roller with the identified high frequency component of the linear velocity at the second roller.

10. The system of claim 9 further comprising:

a high pass filter coupled to the first converter to identify a high frequency component of the first linear velocity; and an adder configured to compute a linear velocity at the first roller with reference to the high frequency component of the first linear velocity and the low frequency component of the second linear velocity.

11. The system of claim 9 further comprising:

a third converter configured to generate a third linear velocity for a moving web at a third roller that drives a web of printable media from a third angular velocity measurement signal generated by a third encoder mounted proximate the third roller;

a second high pass filter coupled to the third converter to identify a high frequency component of the third linear velocity; and the controller being further configured to compute a velocity of the moving web at the third roller with reference to the identified high frequency component of the third linear velocity and the low frequency component of the first linear velocity.

12. The system of claim 9 further comprising:

an adder configured to compute the moving web velocity at the second roller by adding the first linear velocity at the first roller to the identified high frequency component of the second linear velocity at the second roller.

13. The system of claim 12, the controller being configured to interpolate a linear web velocity at a marking station positioned between the first and the second rollers with reference to the first linear velocity, the computed web velocity at the second roller, a first distance between the marking station and the first roller, and a second distance between the marking station and the second roller.

14. The system of claim 9, the controller being further configured to adjust the computed web velocity with reference to a web density variation.

15. The system of claim 9, the controller being further configured to adjust the web velocity with reference to a web tension.

16. The system of claim 15 wherein the web tension is a predetermined web tension.

17. The system of claim 15 wherein the web tension is a web tension measurement obtained from a load cell mounted near the second roller.

* * * * *